US008924760B2

United States Patent
Li et al.

(10) Patent No.: US 8,924,760 B2
(45) Date of Patent: Dec. 30, 2014

(54) SCHEDULER WITH VOLTAGE MANAGEMENT

(75) Inventors: Xiaoming Li, Irvine, CA (US); Surinderjit S. Dhaliwal, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 591 days.

(21) Appl. No.: 12/655,881

(22) Filed: Jan. 8, 2010

(65) Prior Publication Data

US 2011/0173478 A1    Jul. 14, 2011

(51) Int. Cl.
    *G06F 1/32*      (2006.01)
    *G06F 9/48*      (2006.01)

(52) U.S. Cl.
    CPC .............. *G06F 1/3203* (2013.01); *G06F 1/324* (2013.01); *G06F 1/329* (2013.01); *G06F 1/3296* (2013.01); *G06F 9/4893* (2013.01); *Y02B 60/1217* (2013.01); *Y02B 60/1285* (2013.01); *Y02B 60/144* (2013.01)
    USPC ............ 713/324; 713/321; 713/323; 718/102

(58) Field of Classification Search
    CPC .................................. G06F 1/32; Y02B 60/12
    USPC ........................... 713/321–324; 718/102, 105
    See application file for complete search history.

(56) References Cited

U.S. PATENT DOCUMENTS

| | | | |
|---|---|---|---|
| 6,757,897 B1* | 6/2004 | Shi et al. | 718/102 |
| 6,765,910 B1* | 7/2004 | Johnson | 370/394 |
| 7,164,678 B2* | 1/2007 | Connor | 370/392 |
| 7,272,735 B2* | 9/2007 | Fung | 713/320 |
| 7,395,346 B2* | 7/2008 | Pinder et al. | 709/232 |
| 7,617,403 B2* | 11/2009 | Capps et al. | 713/300 |
| 7,694,161 B2* | 4/2010 | Buch et al. | 713/324 |
| 7,779,287 B2* | 8/2010 | Lim et al. | 713/500 |
| 8,127,162 B2* | 2/2012 | Satoh | 713/322 |
| 8,190,939 B2* | 5/2012 | Fields et al. | 713/324 |
| 2008/0127192 A1* | 5/2008 | Capps et al. | 718/103 |
| 2009/0150898 A1* | 6/2009 | Sohn et al. | 718/105 |
| 2010/0061364 A1* | 3/2010 | Damola et al. | 370/352 |
| 2011/0154348 A1* | 6/2011 | Elnozahy et al. | 718/104 |

\* cited by examiner

*Primary Examiner* — Thuan Du
(74) *Attorney, Agent, or Firm* — Farjami & Farjami LLP

(57) ABSTRACT

There is provided a method of scheduler assisted power management for semiconductor devices. By accessing and analyzing workload data for tasks to be completed, a scheduler may provide finer grained control for determining and implementing an efficient power management policy. In this manner, tasks with completion deadlines can be allocated sufficient resources without wasteful power consumption resulting from ramping up of performance through overestimating of voltage or frequency increases. Additionally, power management may be planned for longer periods, rather than looking only at immediate data to be processed and constantly fluctuating voltage and frequency. In this manner, power management can run more smoothly and efficiently compared to conventional means of power management that ignore data from a scheduler when determining power management policy.

21 Claims, 3 Drawing Sheets

SCHEDULER WITH VOLTAGE MANAGEMENT

BACKGROUND OF THE INVENTION

1. Field of the Invention

The present invention relates generally to semiconductor devices, and more specifically to power management of semiconductor devices.

2. Background Art

With the increasing performance and attendant thermal dissipation requirements of modern semiconductor devices, effective power management emerges as a growing concern. In particular, for applications running continuously around the clock, such as heavily loaded data center applications where many processes may run in parallel, even small optimizations in power consumption can lead to large savings in operating costs. Besides practical cost considerations, providing "green" solutions is also desirable to demonstrate corporate responsibility and generate customer goodwill.

Conventionally, power management algorithms have focused on short term or immediate workloads. However, using this narrow focus may lead to constantly fluctuating voltage adjustments and inefficiencies resulting from overestimating or underestimating long-term workloads. For example, voltage and frequency may be unnecessarily ramped up beyond a performance level necessary to meet long-term deadlines, resulting in wasted power consumption.

Accordingly, there is a need in the art to provide power management for semiconductor devices that can provide higher efficiency than conventional methods of power management.

SUMMARY OF THE INVENTION

There is provided a method of scheduler assisted power management for semiconductor devices, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
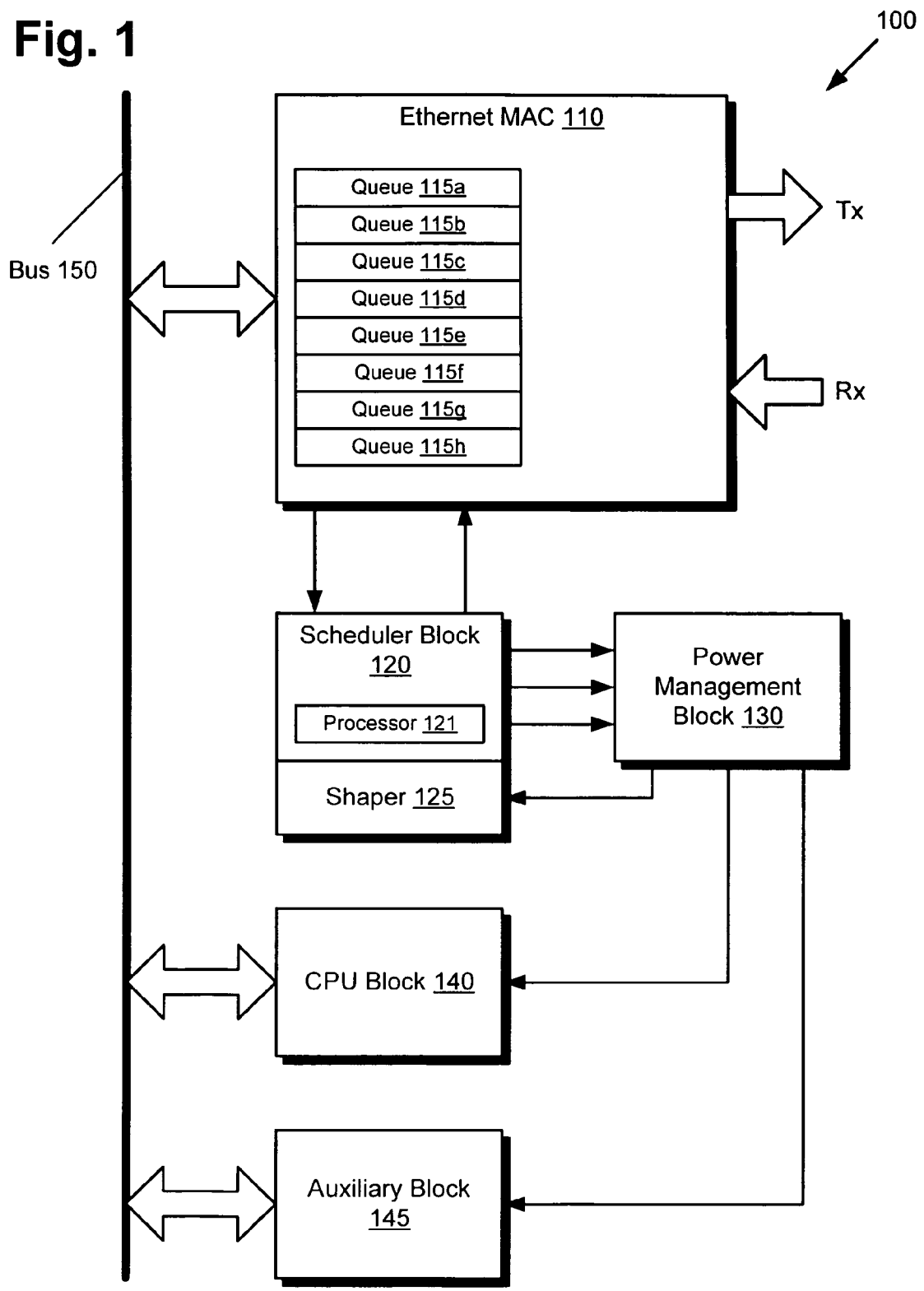
FIG. 1 shows a diagram of an exemplary semiconductor processing system using scheduler assisted power management, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary semiconductor processing system using scheduler assisted power management, according to one embodiment of the present invention. Network traffic routing system 100 of FIG. 1 includes Ethernet MAC 110, scheduler block 120, shaper 125, power management block 130, CPU block 140, auxiliary block 145, and bus 150. Scheduler block 120 includes processor 121 and Ethernet MAC 110 includes queues 115a-115h.

Scheduler block 120 may use processor 121 to provide scheduling services for queues 115a-115h of Ethernet MAC 110, which may be supported by a DMA (Direct Memory Access) engine for queuing outgoing Tx (transmit) data packet workloads. While eight queues are depicted in FIG. 1, alternative embodiments may support different numbers of queues. Scheduler block 120 may prioritize particular queues based on data packet content type, such as voice, data, or video content, or perform other QoS (Quality of Service) adjustments, for example to conform with the Home Gateway Initiative (HGI) version 1.0. In this manner, scheduling rules can be formulated to service real-time media streams, teleconferencing, video gaming, or other latency sensitive applications with a higher priority class, whereas normal data transfers or other latency insensitive streams may be serviced with a lower priority class. Alternatively or additionally, priority classes may be determined based on the severity of resulting packet loss. For example, if a few packets of real-time audio streams are not serviced, jarring audio dropouts or artifacts may result. On the other hand, if a few packets of real-time video streams are not serviced, then minor visual artifacting or missing pixels may occur, which may be less distracting to users than audio defects. Thus, audio packets might be placed in a higher priority class than video packets.

As shown in FIG. 1, several processing blocks are included in network traffic routing system 100 to process queues 115a-115h. Shaper 125 may be directed to specify queue processing delays to moderate the flow of queues 115a-115h and enforce the above QoS rules. CPU block 140 may comprise a plurality of processing cores configured to read network packets from Ethernet MAC 110 for processing into queues 115a-115h over bus 150. Auxiliary block 145 may perform additional services such as supporting IPsec (Internet Protocol Security) for encryption and authentication of network packets.

Scheduler block 120 may then interface with power management block 130 to manage the above processing blocks in the most power efficient manner. In order to process queues 115a-115h in a timely fashion, voltages and operating frequencies of shaper 125, CPU block 140, and auxiliary block 145 may be adjusted up or down by power management block 130 as necessary. However, to avoid unnecessary power usage, voltages and frequencies may be ramped up only as much as necessary to safely meet queue processing completion deadlines, thus optimizing power usage. For idle periods when queues 115a-115h are mostly empty, some cores of CPU block 140 may also be turned off completely or provided with zeroed voltage for extra power savings. In this manner, the components of network traffic routing system 100 are intelligently power optimized based on the dynamic workloads presented by queues 115a-115h.

While the scheduler assisted power management of the present invention has been illustrated using a network traffic routing system, the present invention is not limited to this particular embodiment and is generally applicable to all kinds of processing blocks requiring power management. For example, FIG. 2 shows a diagram of an exemplary semiconductor processing system using scheduler assisted power management, according to another embodiment of the present invention.

Figure 2:
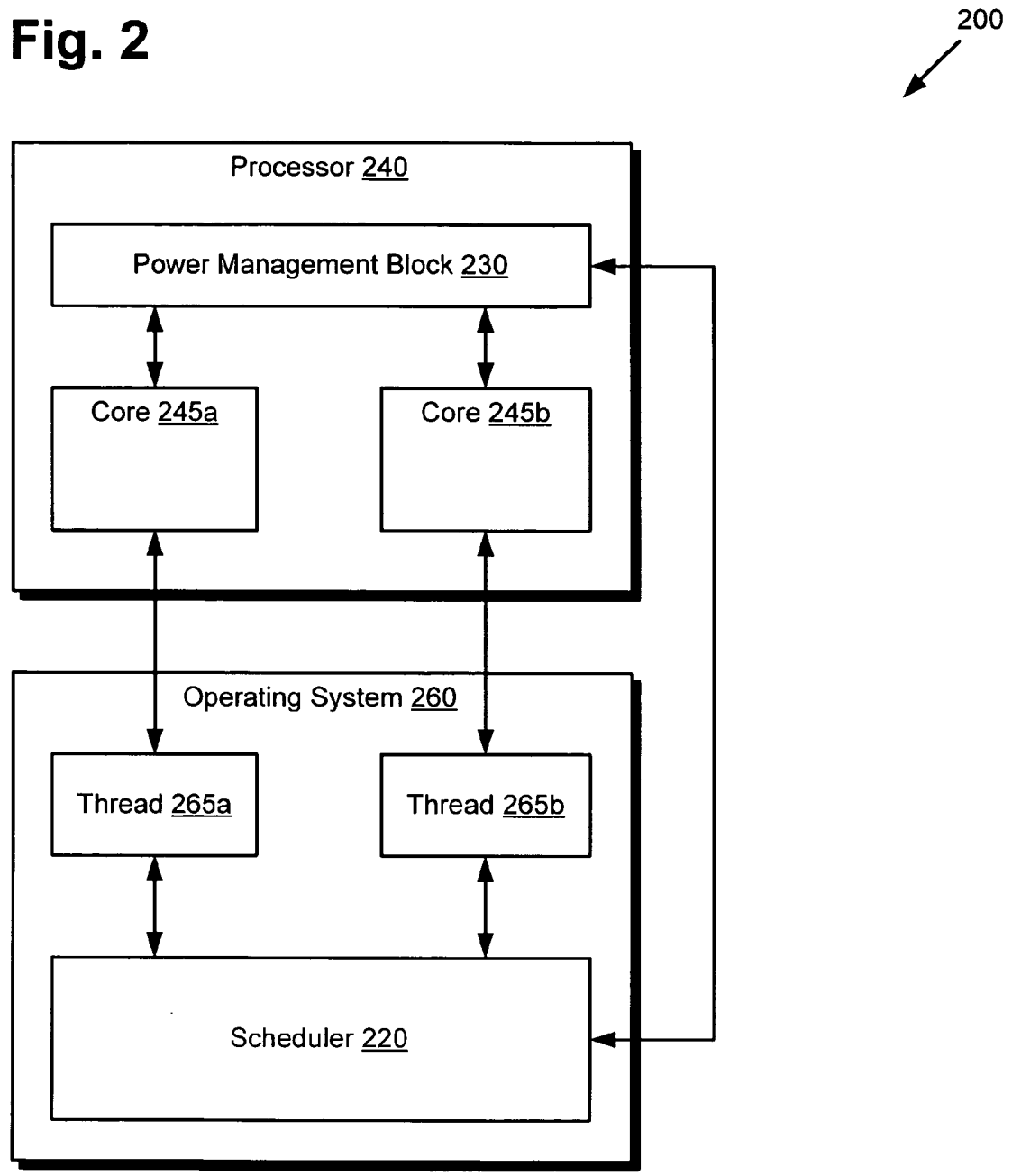
FIG. 2 shows a diagram of an exemplary semiconductor processing system using scheduler assisted power management, according to another embodiment of the present invention.

Computing system 200 of FIG. 2 includes processor 240 and operating system 260. Processor 240 includes power management block 230 and cores 245a-245b. Operating system 260 includes threads 265a-265b and scheduler 220.

As shown in FIG. 2, processor 240 uses conventional on-die power management to control voltages for cores 245a-245b. Operating system 260 executes on processor 240 and includes a software scheduler 220, which is currently executing threads 265a-265b. As shown in FIG. 2, thread 265a is assigned to core 245a and thread 265b is assigned to core 245b. While processor 240 is shown as a dual-core processor, alternative embodiments may include additional cores.

One example application for FIG. 2 might be real-time video encoding for streaming broadcast. Thread 265a may then comprise a real-time video encoding thread, whereas thread 265b may comprise a communications thread to transfer the resulting encoded video over a network. Scheduler 220 thus has detailed completion deadline data for the workloads represented by threads 265a-265b, and may direct power management to block 230 to adjust voltages for cores 245a-245b accordingly. For example, depending on task parameters such as video encoding bit-rate, resolution, and other factors affecting processing workload, the voltage and frequency for core 245a may be adjusted upwards to meet a minimum performance threshold for encoding in real-time without buffer underruns. Similarly, since thread 265b only needs to transfer a small amount of network data compared to the processor intensive task of video encoding, voltage and frequency for core 245b may be adjusted downwards until just enough performance is provided to service the network connection. In this manner, performance and power consumption is best optimized to meet application requirements.

Figure 3:
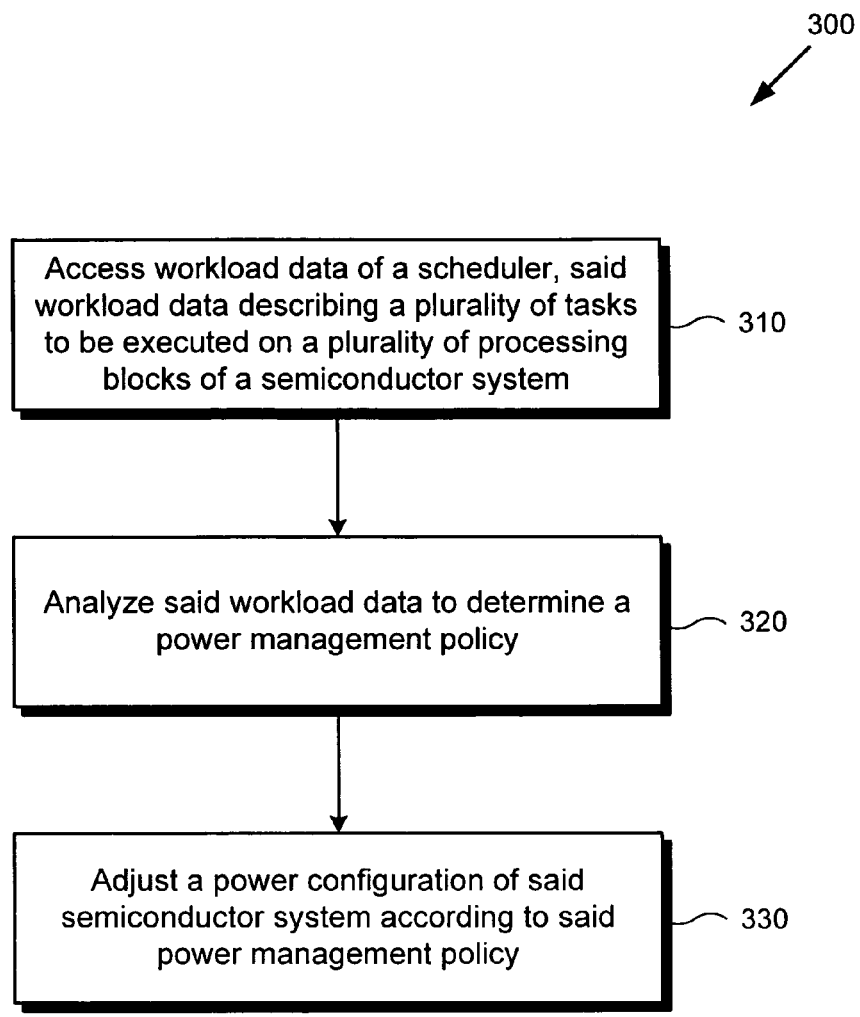
FIG. 3 is a flowchart presenting a method of scheduler assisted power management for semiconductor devices, according to one embodiment of the present invention.

FIG. 3 is a flowchart presenting a method of scheduler assisted power management for semiconductor devices, according to one embodiment of the present invention. Certain details and features have been left out of flowchart 300 of FIG. 3 that are apparent to a person of ordinary skill in the art. For example, a step may consist of one or more sub-steps or may involve specialized equipment, as known in the art. While steps 310 through 330 shown in flowchart 300 are sufficient to describe one embodiment of the present invention, other embodiments of the invention may utilize steps different from those shown in flowchart 300.

Referring to step 310 of flowchart 300 in FIG. 3 and network traffic routing system 100 of FIG. 1, step 310 of flowchart 300 comprises processor 121 of scheduler block 120 accessing queues 115a-115h describing Tx network packets to be processed by shaper 125, CPU block 140, and auxiliary block 145. This workload data provides scheduler block 120 with the information necessary to make power management decisions.

Referring to step 320 of flowchart 300 in FIG. 3 and network traffic routing system 100 of FIG. 1, step 320 of flowchart 300 comprises processor 121 of scheduler block 120 analyzing queues 115a-115h to determine a power management policy. As previously described, queues 115a-115h may be optimized according to particular QoS rules to prioritize real-time latency sensitive traffic groups above latency tolerant data groups. In addition, the power management policy may be configured to provide only as much performance as necessary to expedite queues 115a-115h according to said QoS rules, providing optimal power efficiency.

Referring to step 330 of flowchart 300 in FIG. 3 and network traffic routing system 100 of FIG. 1, step 330 of flowchart 300 comprises processor 121 of scheduler block 120 applying the power management policy from step 320 to shaper 125, CPU block 140, and auxiliary block 145. As previously described, the power management policy may specify increasing or decreasing voltages and operating frequencies of the above processing blocks, or may even completely turn off particular processing blocks such as processor cores of CPU block 140. In this manner, the above processing blocks are optimized to provide sufficient application performance with finely tuned power consumption, which provides greater power savings compared to conventional methods of power management that do not integrate workload data from a scheduler.

From the above description of the embodiments of the present invention, it is manifest that various techniques can be used for implementing the concepts of the present invention without departing from its scope. Moreover, while the present invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of managing power for a semiconductor system using a scheduler, the method comprising:
accessing workload data of said scheduler, said workload data describing a plurality of tasks to be executed on a plurality of processing blocks of said semiconductor system;
determining a power management policy based on analyzing said workload data, wherein said analyzing said workload data includes analyzing said data packet content types of said workload data to distinguish said data packet content types based on severity of packet loss;
adjusting a power configuration of said semiconductor system according to said power management policy, wherein said adjusting said power configuration comprises reducing an operating frequency of said one processing block of said plurality of processing blocks in response to said analyzing of said data packet content types of said workload data to distinguish said data packet content types based on severity of packet loss; and
operating said one processing block of said plurality of processing blocks at said reduced operating frequency in response to said analyzing of said data packet content types of said workload data.

2. The method of claim 1, wherein said adjusting said power configuration further comprises increasing said operating frequency and a voltage supplied to said one processing block of said plurality of processing blocks after said operating said one processing block of said plurality of processing blocks at said reduced operating frequency, said method further comprising:

operating said one processing block of said plurality of processing blocks at said increased operating frequency and voltage.

3. The method of claim 1, wherein said adjusting said power configuration further comprises reducing a voltage supplied to said one processing block of said plurality of processing blocks, and wherein said operating further comprises operating said one processing block of said plurality of processing blocks at said reduced voltage.

4. The method of claim 1, wherein said power management policy is configured to optimally meet completion deadlines of said workload data.

5. The method of claim 1, wherein said plurality of tasks include routing of network packets.

6. The method of claim 5, wherein said analyzing said workload uses Quality of Service (QoS) rules to prioritize processing of network packets.

7. The method of claim 1, wherein said plurality of tasks include executing a thread on a processor core.

8. The method of claim 7, wherein said analyzing said workload uses task parameters of said thread.

9. A scheduler for managing power of a semiconductor system, the scheduler comprising a processor configured to:
  access workload data describing a plurality of tasks to be executed on a plurality of processing blocks of said semiconductor system;
  determine a power management policy based on analyzing said workload data, wherein said analyzing said workload data includes analyzing said data packet content types of said workload data to distinguish said data packet content types based on severity of packet loss;
  adjust a power configuration of said semiconductor system according to said power management policy, wherein adjusting said power configuration comprises reducing an operating frequency of said one processing block of said plurality of processing blocks in response to said analyzing of said data packet content types of said workload data to distinguish said data packet content types based on severity of packet loss; and
  operate said one processing block of said plurality of processing blocks at said reduced operating frequency in response to said analyzing of said data packet content types of said workload data.

10. The scheduler of claim 9, wherein the processor is configured to further adjust said power configuration by increasing said operating frequency and a voltage supplied to one processing block of said plurality of processing blocks after operating said one processing block of said plurality of processing blocks at said reduced operating frequency, said processor is configured to:
  operate said one processing block of said plurality of processing blocks at said increased operating frequency and voltage.

11. The scheduler of claim 9, wherein the processor is configured to further adjust said power configuration by reducing a voltage supplied to said one processing block of said plurality of processing blocks, and wherein operating said one processing block further comprises operating said one processing block of said plurality of processing blocks at said reduced voltage.

12. The scheduler of claim 9, wherein said power management policy is configured to optimally meet completion deadlines of said workload data.

13. The scheduler of claim 9, wherein said plurality of tasks include routing of network packets.

14. The scheduler of claim 13, wherein the processor is configured to analyze said workload by using Quality of Service (QoS) rules to prioritize processing of network packets.

15. The scheduler of claim 9, wherein said plurality of tasks include executing a thread on a processor core.

16. The scheduler of claim 15, wherein the processor is configured to analyze said workload by using task parameters of said thread.

17. The scheduler of claim 15, wherein the processor is configured to adjust said power configuration comprises decreasing said voltage supplied to said one processing block of said plurality of processing blocks without zeroing said voltage to turn off said one processing block of said plurality of processing blocks.

18. The scheduler of claim 15, wherein said data packet content types include a voice packet type and a video packet type, and wherein the processor is configured to distinguish between said voice packet type and said video packet type for determining said power management policy.

19. The method of claim 1, wherein said adjusting said power configuration comprises decreasing said voltage supplied to said one processing block of said plurality of processing blocks without zeroing said voltage to turn off said one processing block of said plurality of processing blocks.

20. The method of claim 1, wherein said data packet content types include voice a packet type and a video packet type, and wherein said analyzing said workload data includes distinguishing between said voice packet type and said video packet type for determining said power management policy.

21. A method of managing power for a semiconductor system using a scheduler, the method comprising:
  accessing workload data of said scheduler, said workload data describing a plurality of tasks to be executed on a plurality of processing blocks of said semiconductor system;
  determining a power management policy based on analyzing said workload data, wherein said analyzing said workload data includes analyzing said data packet content types of said workload data to distinguish said data packet content types based on severity of packet loss; and
  adjusting a power configuration of said semiconductor system according to said power management policy in response to said analyzing of said data packet content types of said workload data to distinguish said data packet content types based on severity of packet loss;
  wherein said data packet content types include a voice packet type and a video packet type, and wherein said analyzing said workload data includes distinguishing between said voice packet type and said video packet type for determining said power management policy.

* * * * *